May 23, 1961

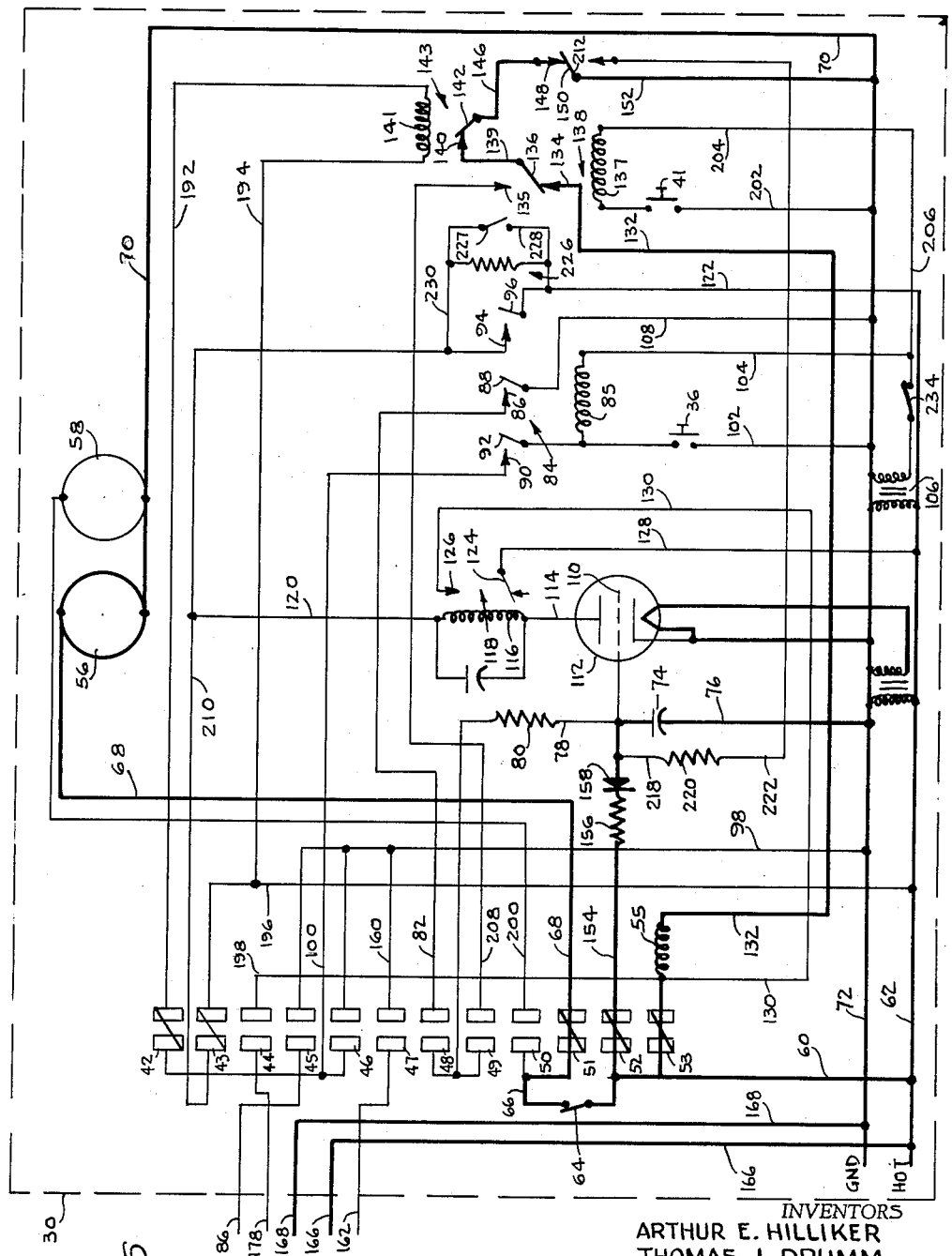

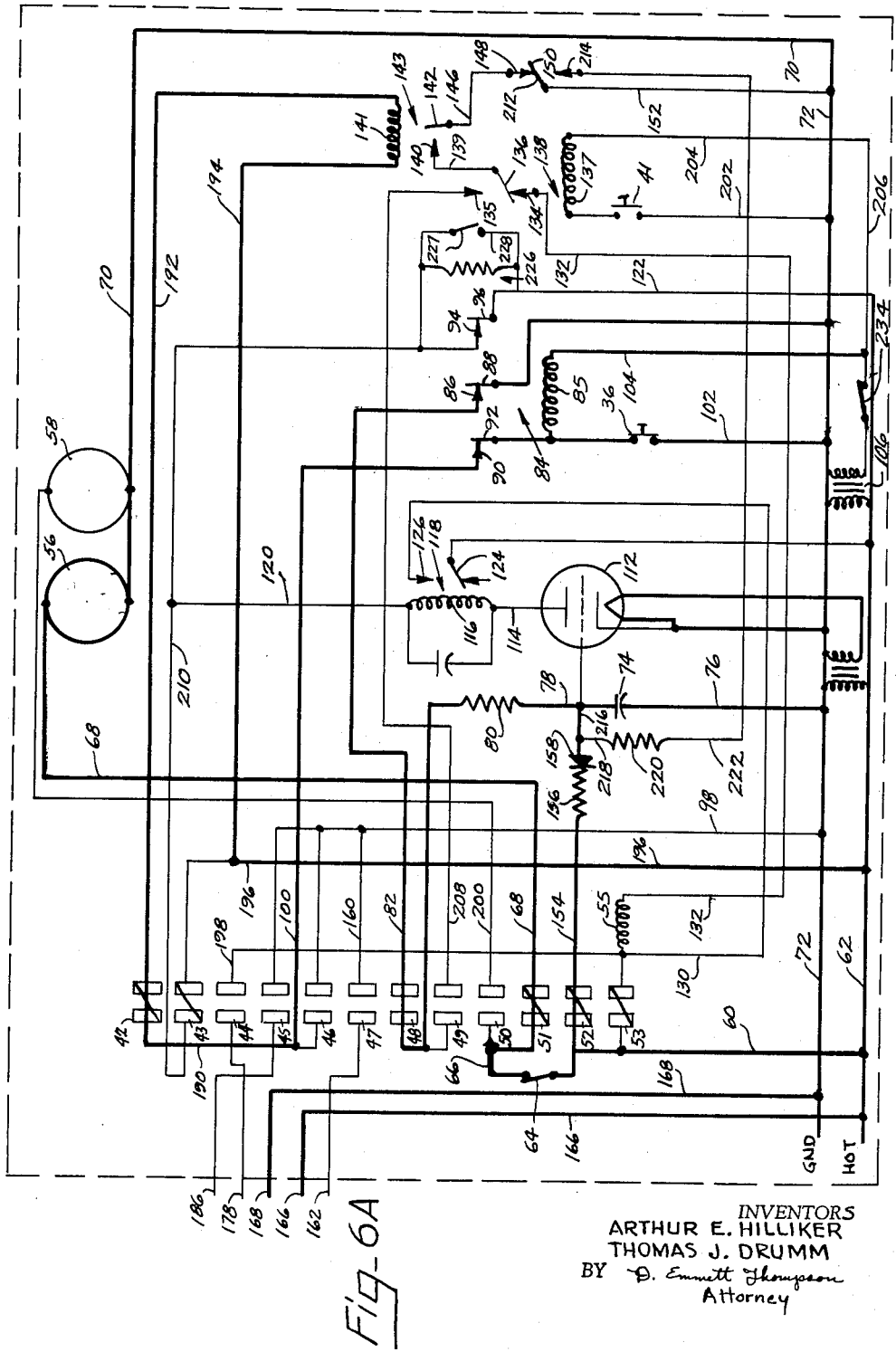

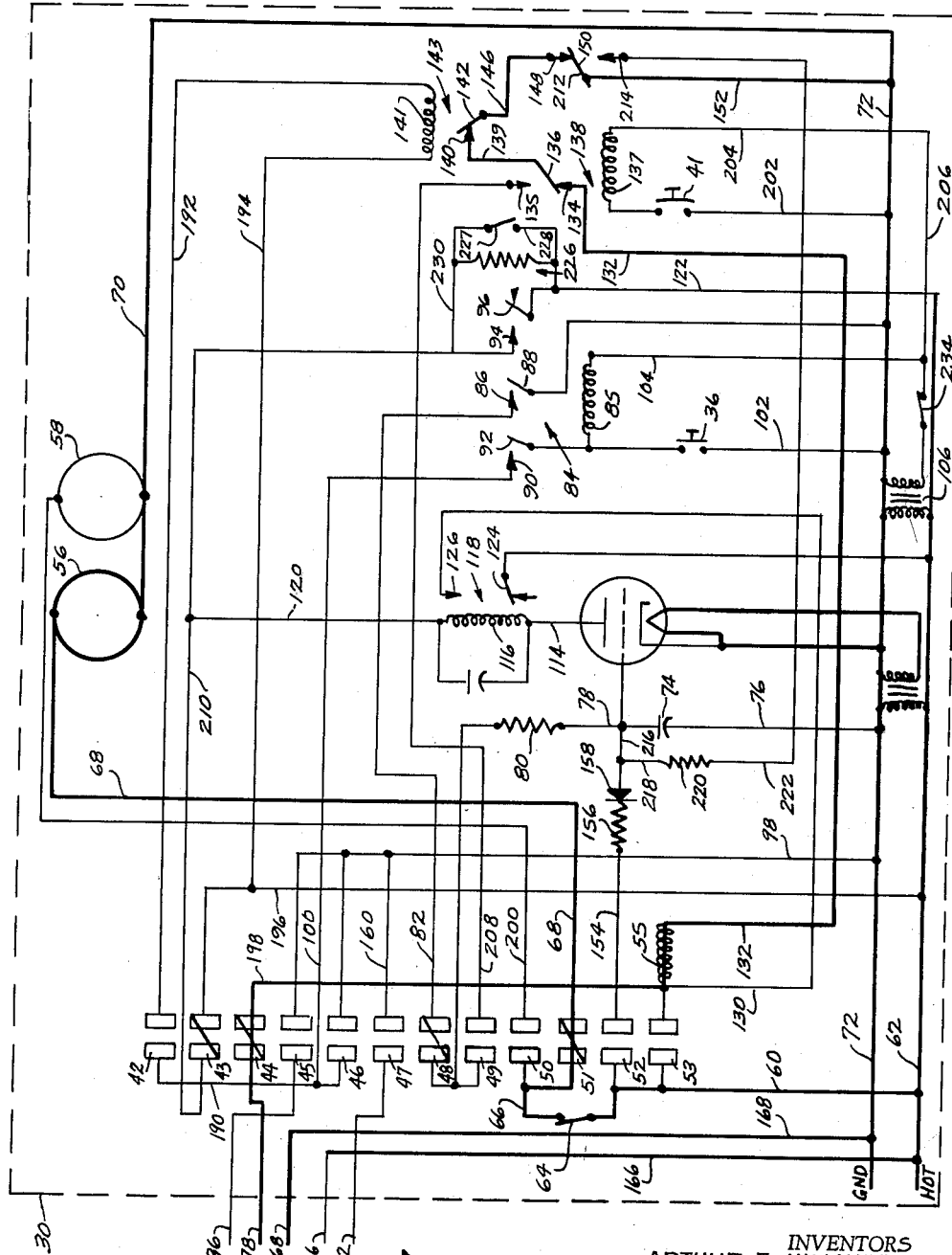

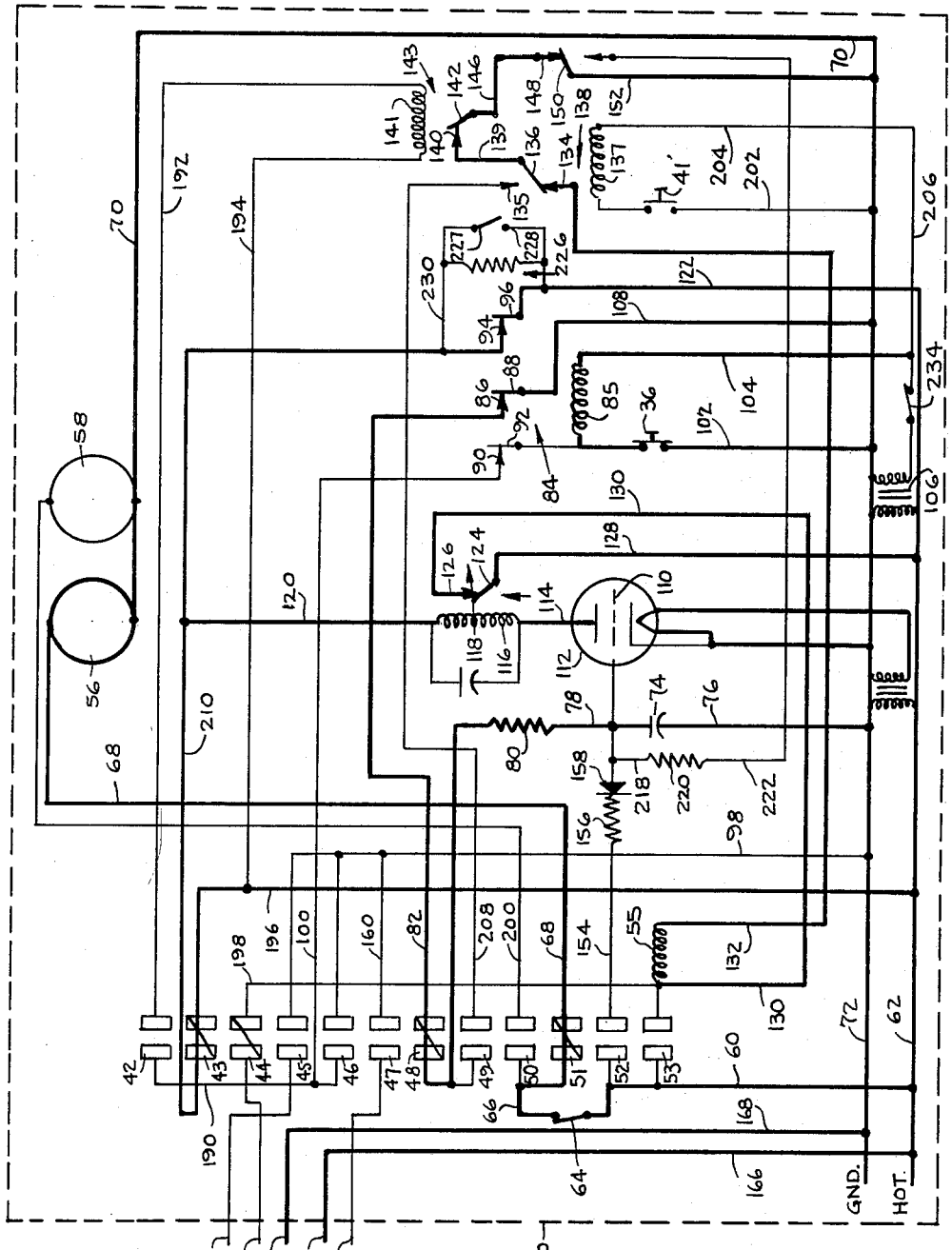

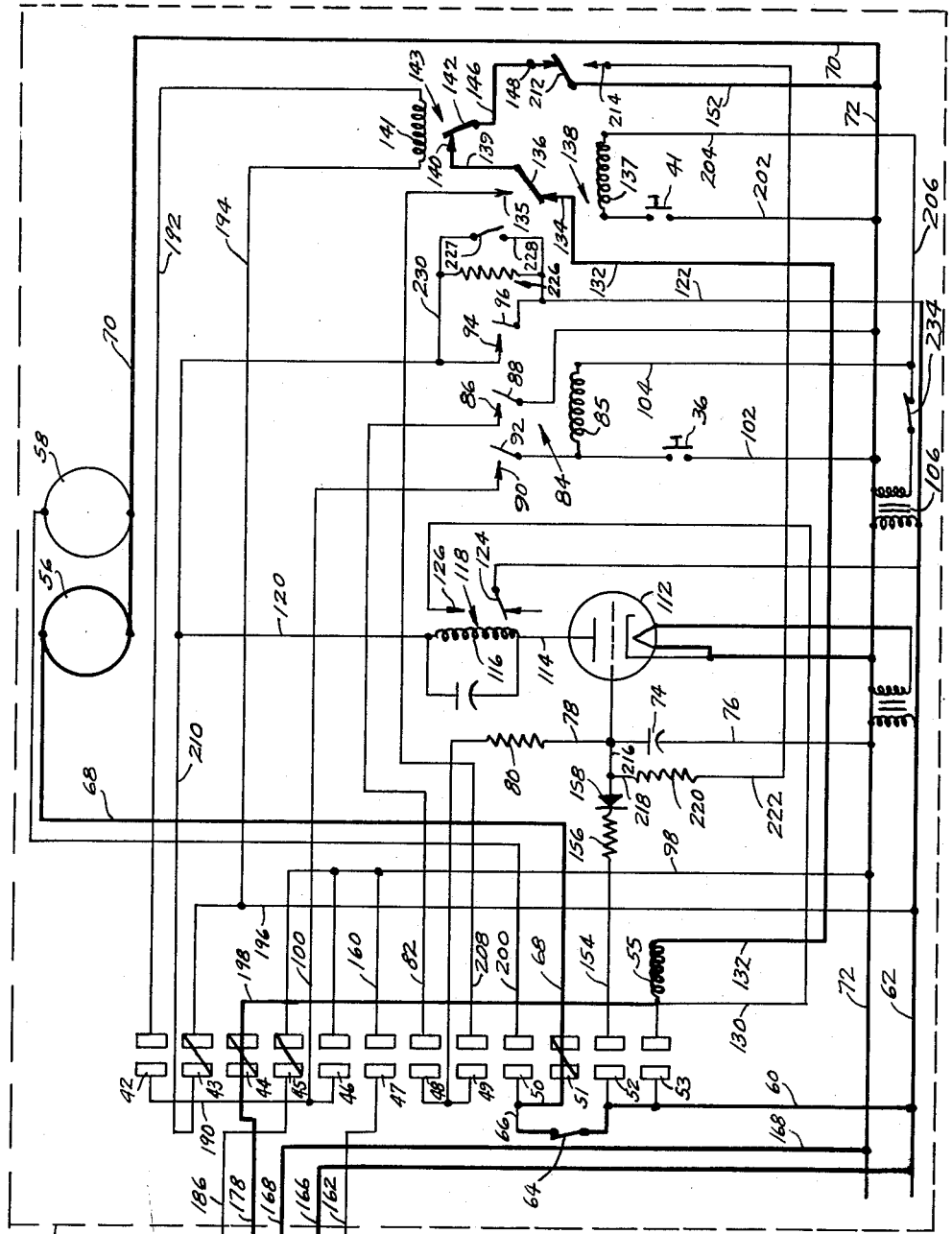

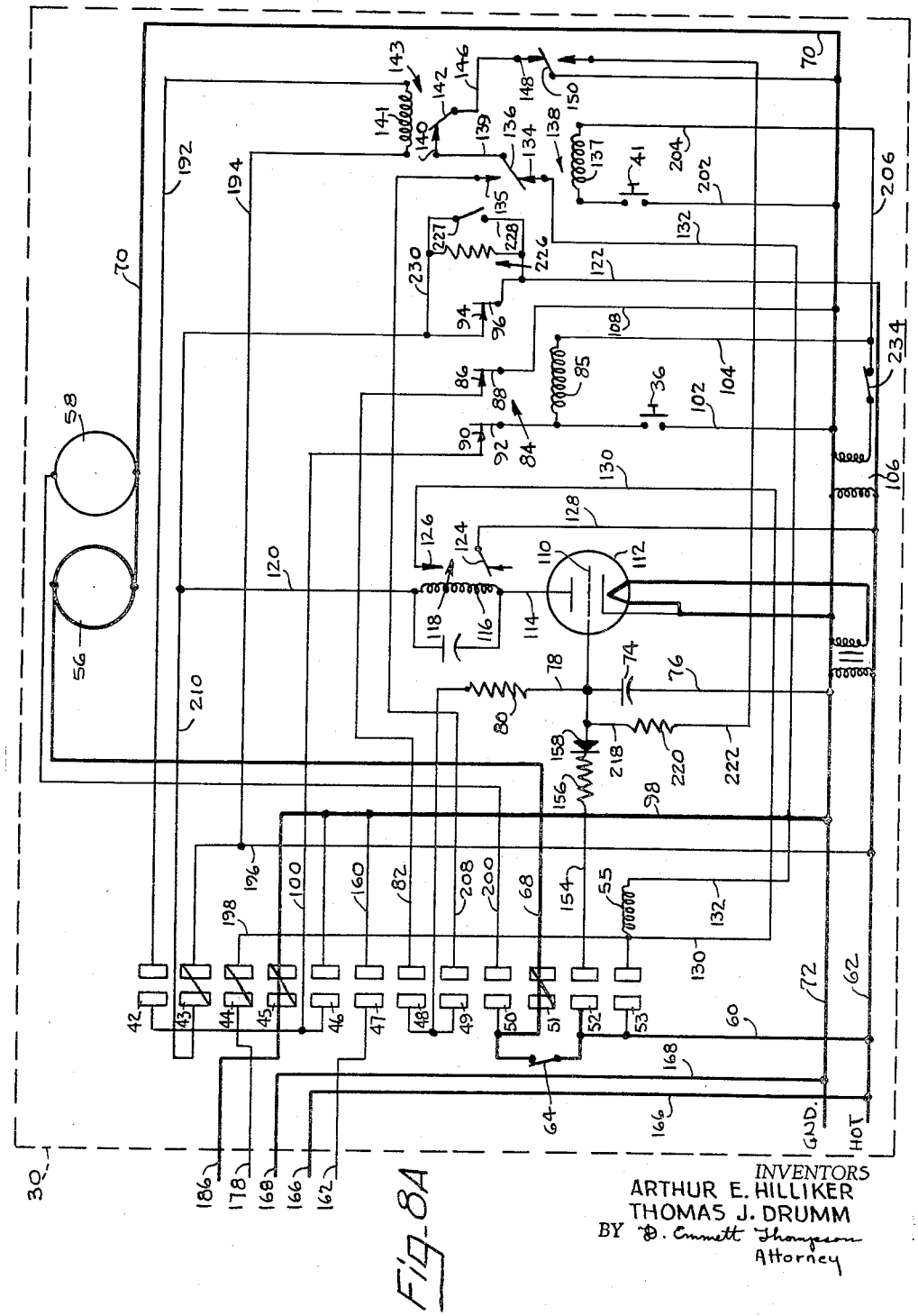

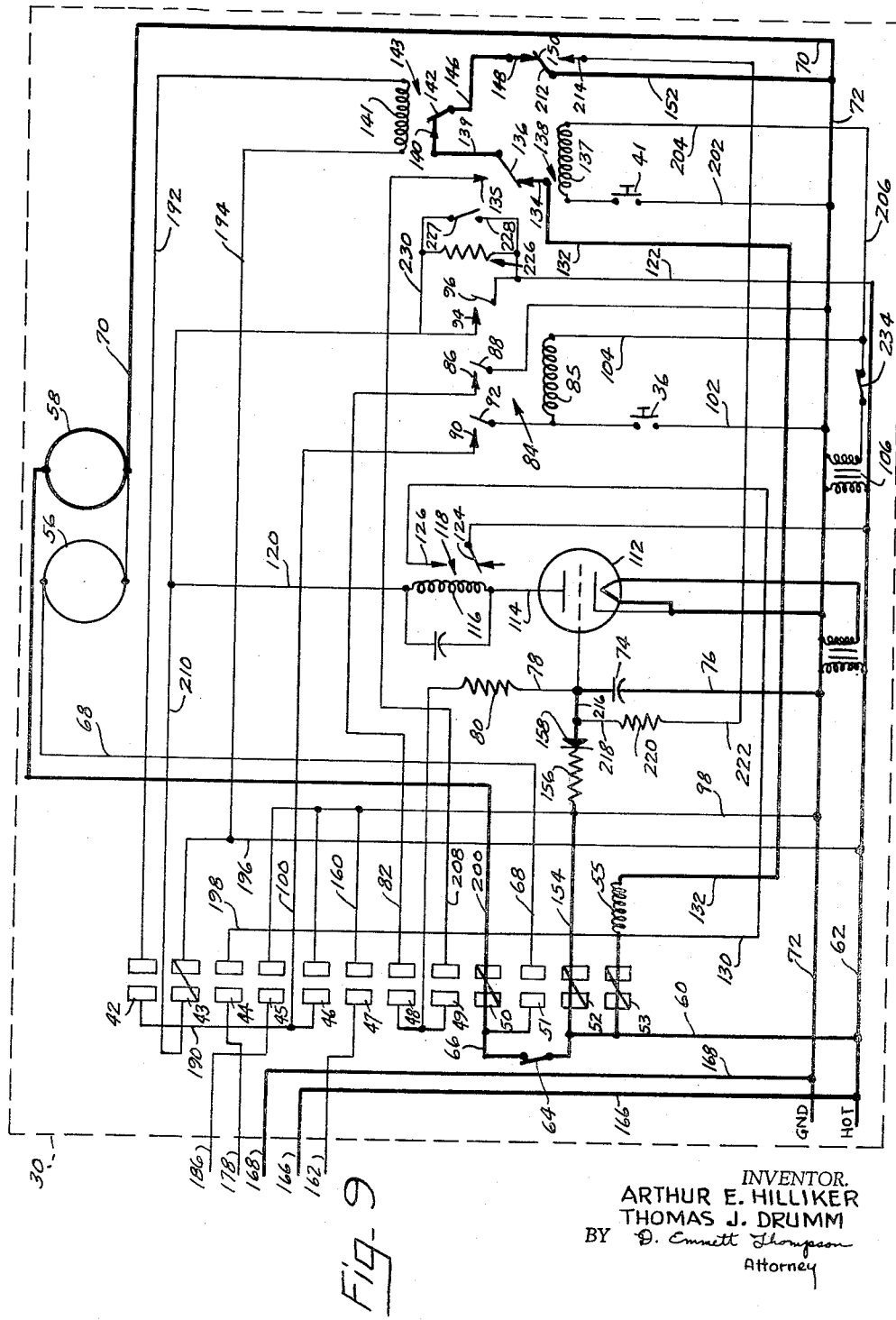

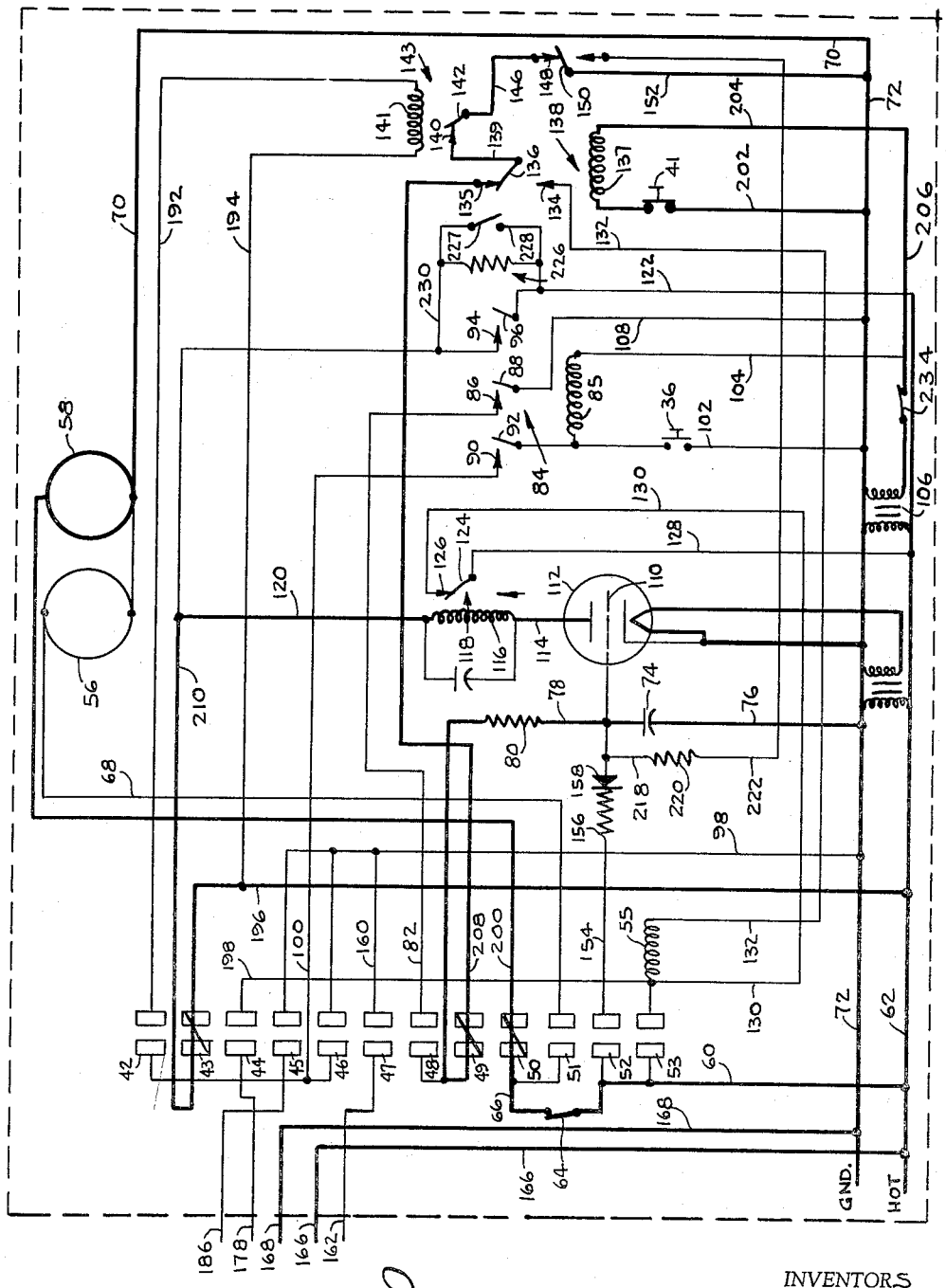

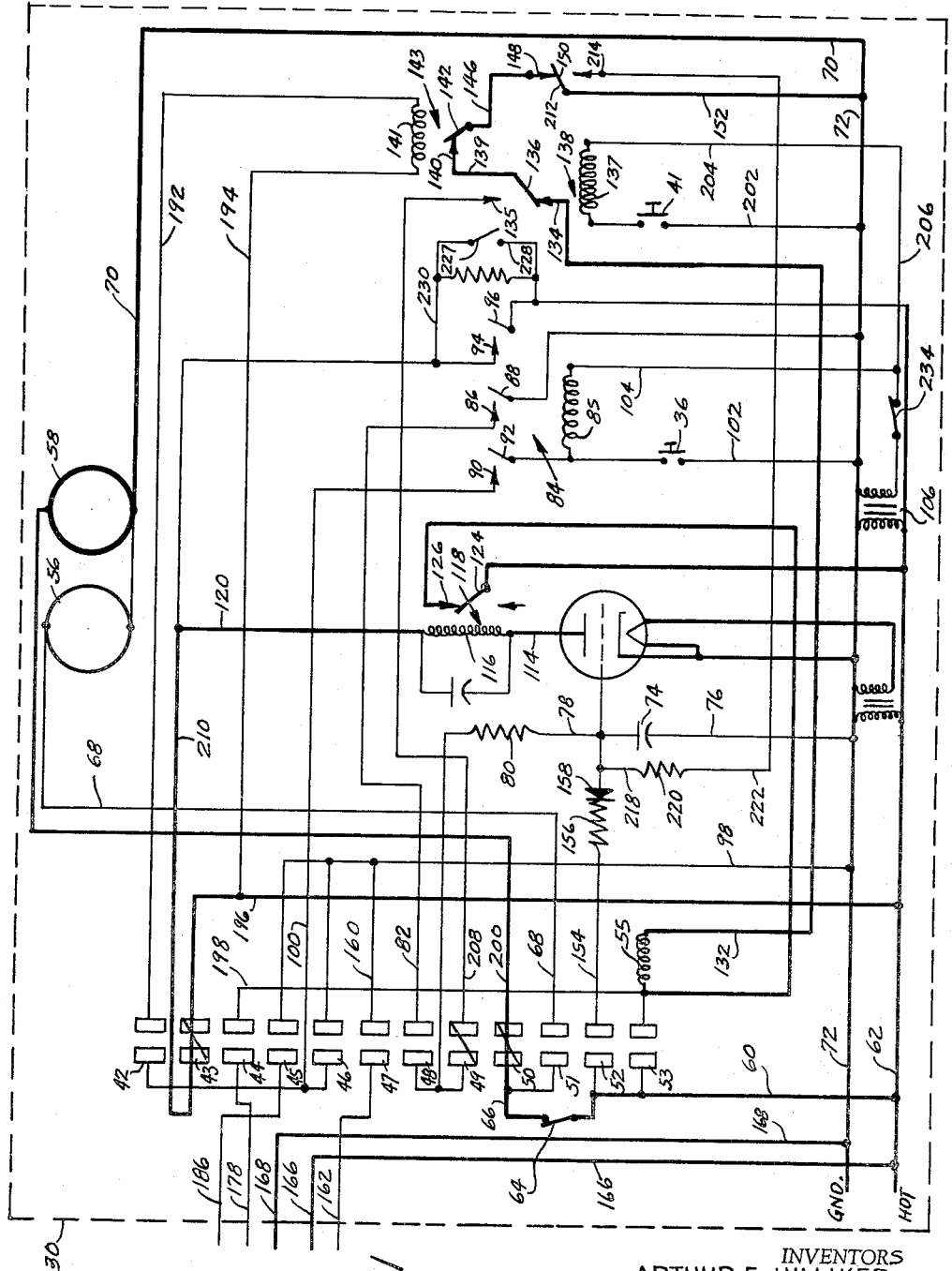

T. J. DRUMM ET AL 2,985,862

METHOD AND APPARATUS FOR CONTROLLING VEHICULAR
TRAFFIC ENTERING A PARKING FACILITY

Filed May 21, 1959

INVENTORS
ARTHUR E. HILLIKER
THOMAS J. DRUMM
BY D. Emmett Thompson
Attorney

United States Patent Office 2,985,862
Patented May 23, 1961

2,985,862

METHOD AND APPARATUS FOR CONTROLLING VEHICULAR TRAFFIC ENTERING A PARKING FACILITY

Thomas J. Drumm, North Syracuse, and Arthur E. Hilliker, Pulaski, N.Y., assignors to Crouse-Hinds Company, Syracuse, N.Y., a corporation of New York Filed May 21, 1959, Ser. No. 814,769

8 Claims. (Cl. 340—51)

This invention relates to and has as an object a new and improved method and apparatus for controlling the entrance of vehicular traffic into a parking facility.

More particularly, this invention has as an object a new and improved apparatus for use in conjunction with a ticket dispensing machine and a traffic signal which functions to insure the proper sequential issuance of parking tickets, or stubs, and to control the indications of said traffic signal in relation to the issuance of said tickets.

Further, this invention has as an object a new and improved method and apparatus for controlling the entrance of vehicles into a parking facility whereby only one parking ticket per vehicle is issued regardless of the number of axles or size of the vehicles entering the parking facility.

Further, this invention has as an object a new and improved apparatus operable in conjunction with a ticket dispensing machine wherein a ticket is issued to each vehicle only when the vehicle enters the parking facility in a certain predetermined direction.

Briefly described, this invention comprises the method of controlling the entrance of vehicles into a parking facility by detecting the entrance of a vehicle into the facility; actuating the controller as a result of the detection of the vehicle; issuing a parking ticket as a result of said detection; changing a signal indication from a normal stop indication to a proceed indication subsequent to the removal of the parking ticket from the ticket dispensing machine; and thereafter detecting the movement of the vehicle past the signal indicator and returning the signal indicator to the normal stop indication as a result of the second detection of the vehicle.

Briefly described, the apparatus of this invention comprises a controller actuated by a pair of vehicle detectors to issue a parking ticket upon actuation of the first vehicle detector by a vehicle entering the parking facility; changing a signal indicator from a normal stop indication to a proceed indication through said controller after the vehicle operator has removed a parking ticket from the ticket dispensing machine; detecting the movement of the vehicle past the signal indicator and returning the signal indicator to the normal stop indication through said controller as a result of the second vehicle detection. The controller comprises a cam shaft unit rotatable through a plurality of discrete positions to control the operation of the ticket dispensing machine and the signal indication display sequence. The cam shaft unit may be of the structural arrangement disclosed in Patent No. 2,301,999 to Carl H. Bissell, November 17, 1942, and the specific cam structure employed may be that of the type disclosed in Patent No. 2,163,864 to Carl H. Bissell, June 27, 1939.

The cam shaft is motor operated and the motor is actuated and rotated through the plurality of discrete positions in response to the actuation of vehicles entering the parking facility in the proper manner.

The invention consists in the novel features and in the combinations and constructions hereinafter set forth and claimed.

In describing this invention, reference is had to the accompanying drawings in which like characters designate corresponding parts in all the views.

In the drawings—

Figures 3 through 12 and Figures 4a, 6a, 7a and 8a inclusive, are circuit diagrams of the controller apparatus wherein the heavy lines represent those portions of the circuit that are then conducting current, and Figure 13 is a sequence chart showing the cam unit contacts closed in each position of the cam shaft.

Figure 2:
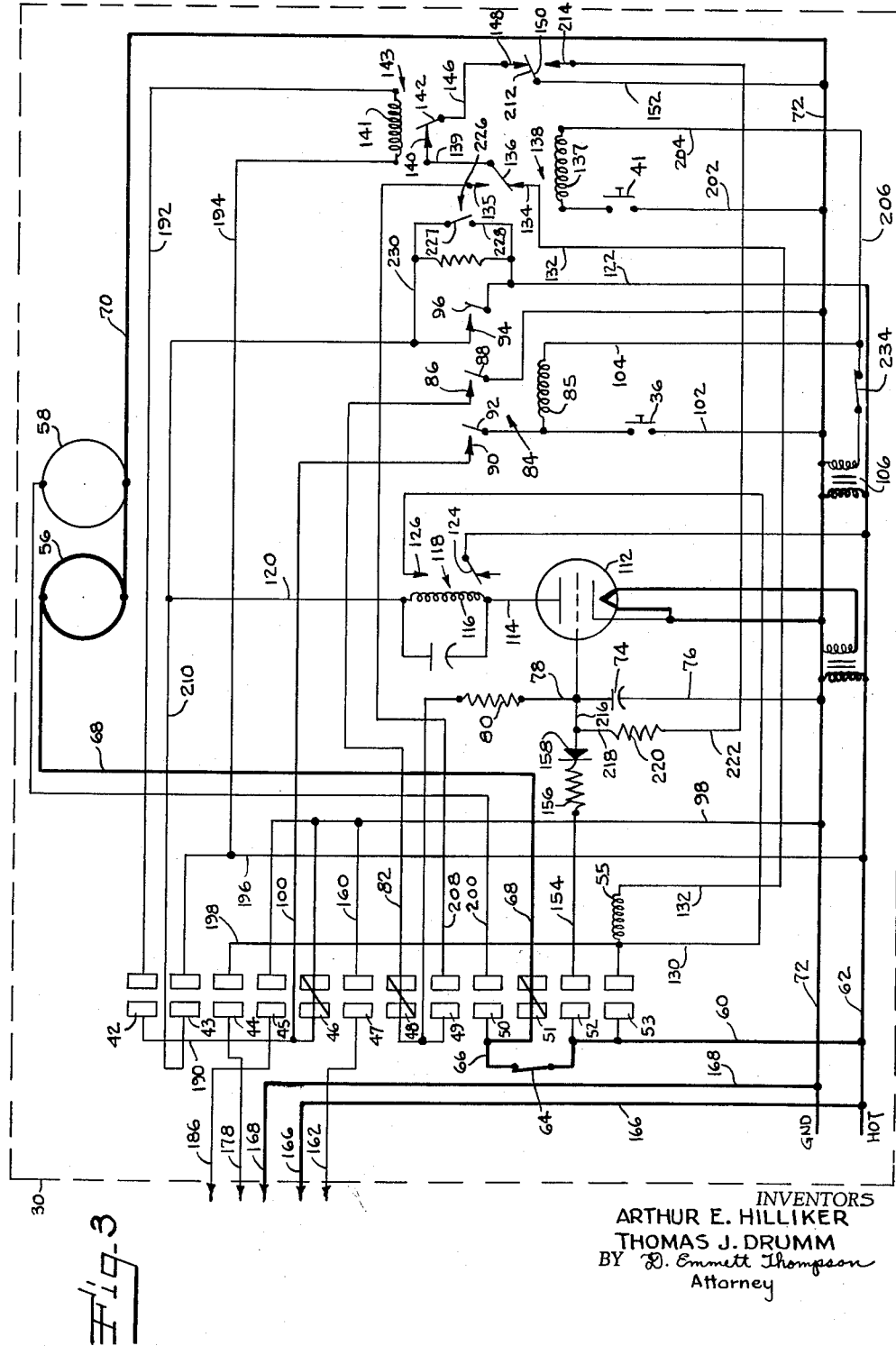
Figure 2 is a diagrammatic illustration of the circuit of a ticket dispensing machine wherein the heavy lines indicate the portions of circuit normally conducting current.
Figure 3:
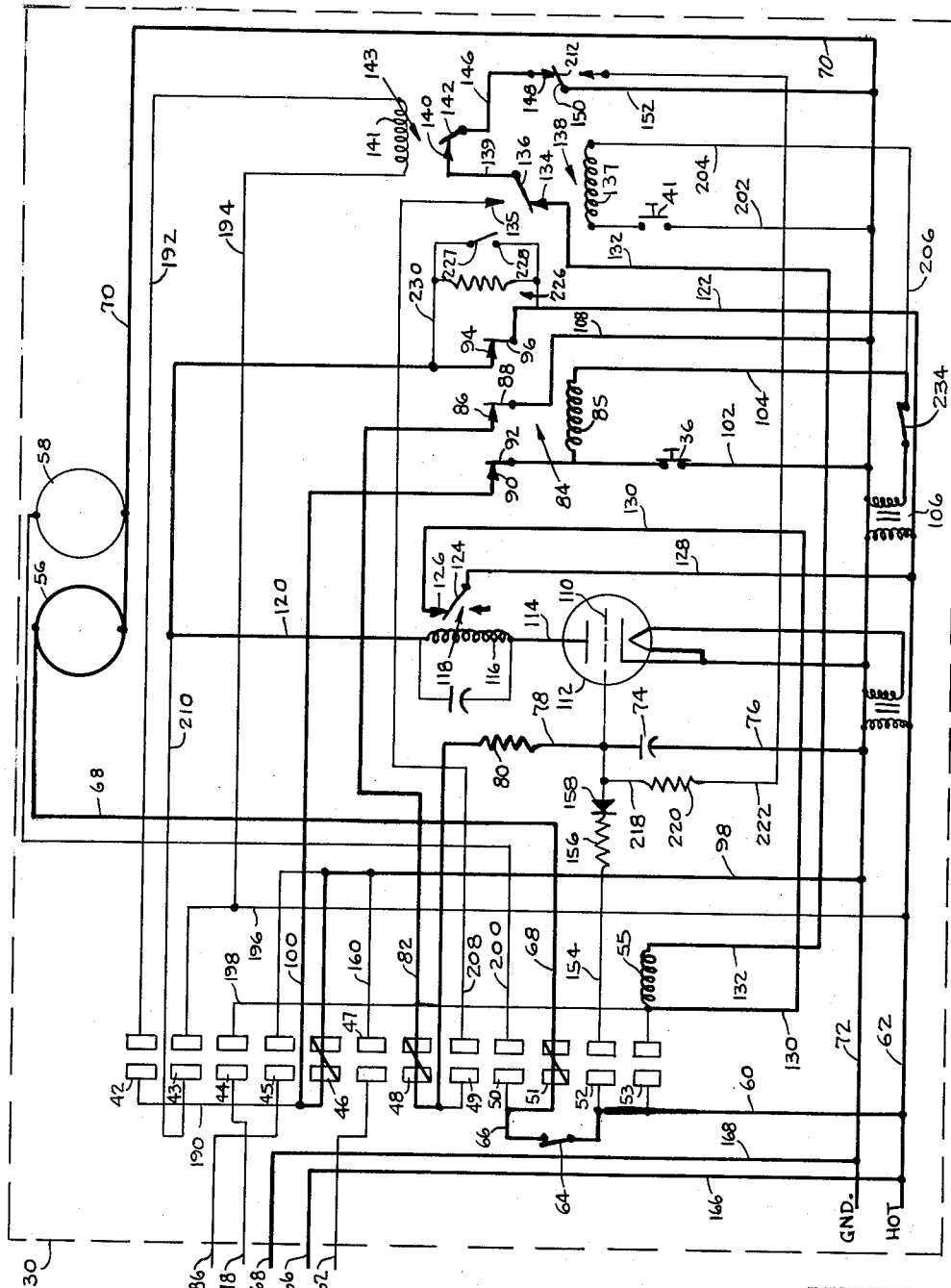

Referring to the drawings, the dash lines indicated at 20 on Figure 2, and 30 on Figure 3 comprise, respectively, a ticket dispensing machine of any suitable type which comprises no part of this invention; and the controller for controlling the operation of the ticket dispensing machine, and when Figures 2 and 3 are placed side by side, they comprise the complete circuit for the apparatus comprising the invention.

Figure 1:
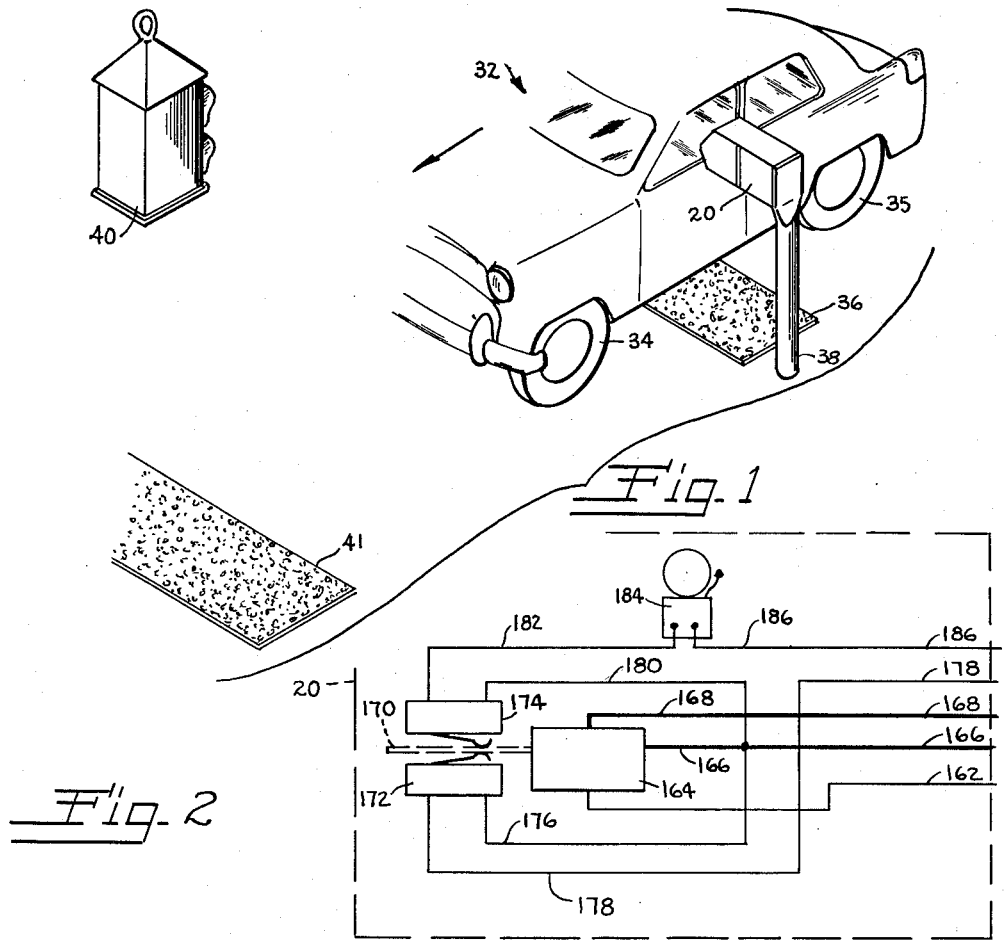
Figure 1 is a perspective view showing the parking facility control apparatus and a vehicle entering the parking facility.

Referring to Figure 1, a vehicle 32, having front and rear wheels 34, 35, has been shown entering the parking facility which may be a parking garage, lot, or the like, and is shown with its front wheels 34 having passed over the first vehicle detector 36. Positioned adjacent the first detector 36 is the ticket dispensing machine 20, indicated by the dash lines in Figure 2, and the machine 20 is mounted on a supporting standard 38 with the machine 20 so positioned as to permit the operator of the vehicle to remove the parking ticket issued by the machine 20.

The vehicle 32 enters the parking facility in the direction of the arrow and subsequent to the actuation of the detector 36 and removal of the parking ticket from the dispenser 20, the vehicle proceeds in response to a change in signal indication displayed by the traffic signal indicator 40, proceeds forwardly over and past a second vehicle detector 41. The detectors 36 and 41 are placed farther apart than the wheel basis of the largest vehicle using the facility.

Referring now to the controller indicated by the dash lines 30, in Figure 3, the controller comprises a plurality of contacts 42 through 53, inclusive, actuated to open and closed positions by the cam shaft unit, as described in Patent No. 2,301,999 above-referred to. The sequential opening and closing of the contacts 42 through 53 in the various positions of the cam shaft unit and the designations for the contacts 42 through 53 are illustrated in the chart of Figure 13 and will be described hereinafter in detail.

The cam shaft unit includes a motor running coil 55 connected in circuit with certain of the contacts 42 through 53 to rotate the cam shaft unit through various positions.

A pair of signal indicator lights 56 and 58 are connected in circuit with certain of the contacts to give the proper signal display indication to the vehicles entering the parking lot facility, and as shown in this illustration the signal light 56 being the red, or stop indication, and the signal light 58, being the green, or proceed indication. It is to be understood that other suitable types of signal indicators having printed letters, or the like, may be used if desired.

Additionally, the controller includes an electron vacuum tube which is rendered conductive by the detectors 36 and 42 to initiate operation of the controller.

The heavy lines shown in Figure 3 illustrate the condition of the controller circuit in the first interval which is the normal, or rest position. In this position, it will be seen that the red light contacts 51 are closed and connect the red stop indicator light 56 in circuit by a line 60 connected to the power side 62 of a 115 60-cycle power supply, the circuit being completed through a manually operated signal shutdown switch 64 which is normally closed, line 66, contacts 51, line 68, signal 56, and line 70, which is connected to the other side 72 of the power supply. In this position of the cam unit a capacitor 74 has been previously charged to peak voltage by a manner to be hereinafter described and the capacitor 74 is connected to the hot side of the power supply 62 by a line 76. The opposite side of the capacitor 74 is connected by line 78 through a limiting resistor 80 to the number one motor contacts which are closed in the rest position. The opposite side of contacts 48 are connected by line 82 to the second set of contacts of a relay 84 having three sets of contacts and the circuit is open through the second set of contacts 86 and 88.

The relay 84 also includes a first pair of normally open contacts 90 and 92 and a third pair of normally opened contacts 94, 96. It will be seen that in this position the capacitor 74 is unable to discharge since the circuit is open through the contacts 86 and 88.

Also in this position of the controller, the contacts 46, which are memory contacts, are closed and are connected to the common side 72 of the power supply by line 98. The opposite side of the contacts 46 are connected by line 100 to the contact 90 of the relay 84 which is open so as to break the circuit through the contacts 46. In this position, the controller is at rest and will remain in that position until the first vehicle detector 36 is actuated by the entrance of a vehicle 32 into the parking facility.

Figure 4:
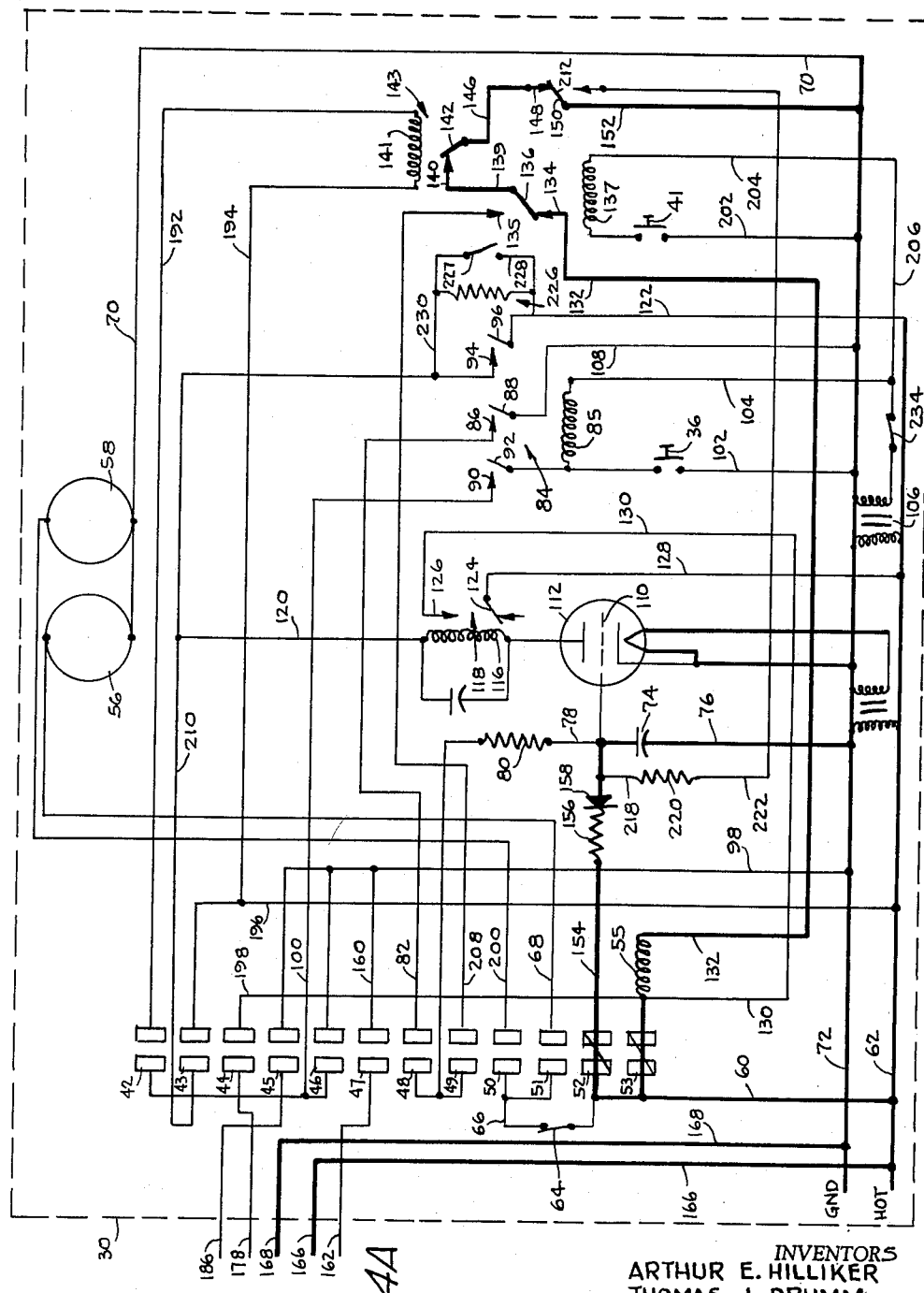

Figure 4 illustrates the condition of the controller circuit upon actuation of the vehicle detector 36. In this position the actuation of the detector 36 connects the coil 85 of relay 84 to the ground side 72 of the power supply by line 102. The opposite side of the coil 85 is connected to the hot side 62 of the power supply through line 104. As a safety feature, the detector is supplied with current from the low voltage side of the transformer 106 so as to prevent any shock hazards in connection with the detector 36, all of which is conventional.

Energization of the coil 85 of relay 84 simultaneously closes the three pairs of contacts of the relay 84. Thereupon the capacitor 74 discharges through the circuit comprising lines 76, line 78, contacts 48, line 82, contacts 86–88 and line 108. The discharge of the capacitor 74 renders the control grid 110 of the electron vacuum tube 112 sufficiently positive through the line 113 to permit the tube 112 to conduct. At the same time, the coil 85 of the relay 84 remains energized through a memory circuit comprising the line 98, memory contacts 46, line 100, contacts 90–92 of relay 84, coil 85 and line 104.

The closing of the contacts 94–96 of the relay 84 completes the plate circuit of the tube 112 through the circuit comprising the line 114, coil 116, of relay 118, line 120, contacts 94–96 of relay 84 and line 122 to the hot side 62 of the power supply.

Energization of the coil 116 of relay 118 causes the contacts 124, 126 of relay 118 to close, thereby completing a circuit through the motor coil 55 of the cam shaft unit through the line 128 connected to the hot side 62 of the power supply, contacts 124–126 of the relay 118, line 130, motor coil 55, line 132, contacts 134, 136 of relay 138, line 139, contacts 140–142 of relay 143 and line 146 through contacts 148–150, line 152 to the common side 72 of the power supply. Energization of the motor running coil 55 moves, or rotates, the cam unit to interval 2, shown on the chart of Figure 13.

During the rotation of the cam unit, the charge and run contacts 52 and 53 are closed to charge the capacitor 74 and to completely rotate the cam unit to the next position, that is, position or interval 2. The contacts 52 and 53 are closed between every interval by the rotation of the cam unit to charge the capacitor through a "charge"

circuit comprising line 60, contacts 52, line 154, limiting resistor 156, rectifier 158, line 78, capacitor 74 and line 76. The motor coil 55 is energized through a "run" or "rotating" circuit comprising line 60, contacts 53, coil 55, line 132, contacts 134–136, line 139, contacts 140–142, line 146, contacts 148–150 and line 152. The "charge" and "run," or "rotating" circuits just described, are shown in Figure 4A of the drawings and serve to index the cam unit from one interval to another and to charge the capacitor 74 between each interval, or position, of the cam unit in order to control conductivity of the tube 112.

Figure 5:
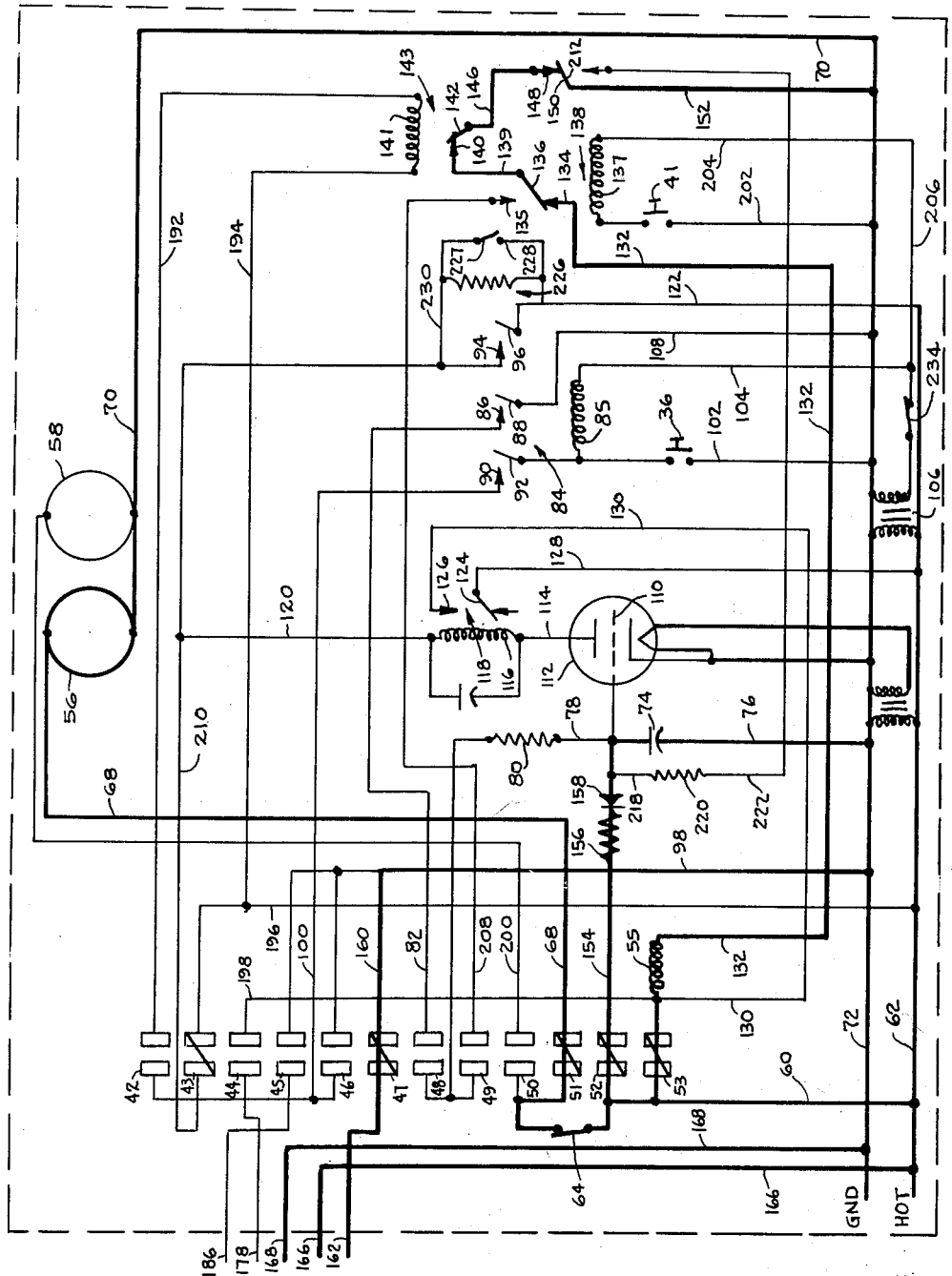

As described above, the actuation of the first detector 36 by the vehicle 32 serves to rotate the cam unit from the position shown in Figure 3 to the second position or interval of the cam unit, shown in Figure 5. In the second position, the issue contacts 47 are closed by the cam unit connecting the ground side 72 of the power supply through the line 98 and line 160 through the contacts 47 to line 162 which is connected to a ticket issuing apparatus, diagrammatically indicated at 164, in Figure 2, located in the ticket dispensing machine 20.

The hot side of the power supply 62 is connected by line 166 to the ticket issuing apparatus 164 whereby a circuit is completed through the closed contacts 47 to cause a parking ticket to be issued by the apparatus 164.

The ticket issuing apparatus 164 may comprise a solenoid actuated ticket issuing mechanism as well as a time stamp and ticket printing and severing mechanism, all of which is conventional, and comprises no part of this invention.

As will be seen in Figure 2, a continuous circuit is connected through the apparatus 164 by line 166, connected to the hot side of the power supply and line 168 connected to the common side of the power supply 72 whereby to provide a continuous power supply for the time stamping and printing apparatus contained in the ticket issuing mechanism 164.

The closing of the contacts 47 causes a ticket, indicated by the dash lines at 170, to be issued from the apparatus 164 and the ticket passes between a pair of micro-switches 172 and 174. The micro switch 172 is connected by line 176 to the hot feed line 166 and is normally closed whereby issuance of the ticket 170 opens the switch 172 and breaks a circuit from the hot feed line 166, line 176, switch 172, line 178 to the contacts 44, all for a purpose to be hereinafter described.

The micro-switch 174 is normally open and the issuance of the ticket 170 closes the switch 174 to connect the line 180 from the hot feed line 166 to a line 182 connected to one side of a buzzer 184. The opposite side of buzzer 184 is connected by a line 186 to the contacts 45 for a purpose to be hereinafter described.

Referring again to Figure 5 in this position, the cam unit also closes the run contacts 53, thus completing a circuit through the motor coil 55, as described in connection with Figure 4A, to rotate the cam unit to interval 3. As also described in connection with Figure 4A, the charge contacts 52 are also closed between intervals 2 and 3 to charge the capacitor 74.

Also in interval 2, shown in Figure 5, the stop contacts 43 are closed completing the plate circuit of the vacuum tube. The tube, however, will not conduct due to the fact that the charge circuit just described places a sufficiently negative bias on the control grid of the vacuum tube to prevent the tube 112 from conducting. The stop contacts 43 are closed in every interval, but interval one, so that the interval one is the only position in which the controller is statically at rest. The charging of the capacitor, however, between each interval prevents the tube 112 from conducting even though the plate circuit is closed through the stop contacts 43 unless and until the capacitor 74 is first discharged.

Finally, in interval 2 the red contacts 51 are also closed to complete a circuit through the stop, or red, signal indicating lamp 56, as described in connection with Figure 3.

Interval 3 is normally a skip interval, the controller being rotated or indexed through the circuit including cam contacts 53 and motor coil 55, as described in connection with Figure 4A, to rotate the controller to interval 4. The circuit condition of the controller during interval 3 is shown in Figure 6.

If, however, as seen in Figure 6a, a vehicle stops with its front wheels on the first detector 36, the special contacts 42 are closed in interval 3 so that a ground will be supplied through the detector 36 by line 102 from the ground 72 of the power supply. As described in connection with Figure 4, actuation of detector 36 closes contacts 90 and 92 of the relay 84. This connects a circuit from the ground side 72 of the power supply through line 102 and detector 36, contacts 90 and 92, line 100, line 190, contacts 42, line 192, coil 141 of relay 143, line 194 to line 196 connected to the hot side 62 of the power supply. Energization of the coil 141 of relay 143 opens the ground side of the motor circuit, previously described, through the contacts 140 and 142 of relay 143, thus preventing the rotation of the cam unit until the vehicle has proceeded past the first detector 36 whereby the relay 143 becomes de-energized allowing the contacts 140 and 142 to return to their normally closed position to complete the motor circuit to rotate the cam unit to the fourth position, or interval.

The controller stops in interval 4, shown on the chart in Figure 13, until the ticket 170 is removed from the ticket dispensing machine 20. As seen in Figures 2 and 7, removal of the ticket 170 by the operator of the vehicle 32 causes the switch 172 to return to the normally closed position wherein a circuit is connected from the hot feed line 166 through line 176, switch 172, line 178, closed ticket contacts 44, line 198, motor coil 55, and through the ground side of the motor coil circuit, as previously described, to index the controller to interval 5.

Interval 5 is normally a skip interval and is shown in Figure 8 wherein removal of the ticket has connected the motor coil 55 in circuit through the closed ticket contacts 44 as described in connection with Figure 7 to rotate the controller to interval 6.

If, however, the motorist fails to remove the ticket from the ticket dispensing machine and the rear wheels of the vehicle 32 pass over the detector 36, the controller is indexed to interval 5, through the circuit shown in Figure 7a in the manner described in connection with Figure 4.

In interval 5, the buzzer contacts 45 are closed, as shown in Figure 8a. In this interval should the vehicle operator neglect to remove the ticket 170 a circuit is completed from the hot side 62 of the power supply through line 166, line 180, normally open switch 174, which is closed, due to the presence of the ticket 170, line 182, buzzer, or alarm, 184, and line 186 through closed contacts 45 to line 98, which is connected to the common side 72 of the power supply. This circuit causes the buzzer, or alarm, to ring until the driver of the vehicle 32, or an attendant, removes the ticket 170, thus opening the circuit through the normally open microswitch 174.

Thereupon the controller is indexed to interval 5, as described in connection with Figure 8, and as also described in connection with that figure, interval 5 is a skip interval, and the controller is indexed through the closed ticket contacts 44 and motor coil 55 to rotate the controller to interval 6.

Interval 6 is a skip interval wherein the signal indication is changed from stop to proceed to indicate to the driver of the vehicle 32 that he may proceed into the parking facility. As seen in Figure 9, the driver is given the proceed or "go" indication through a circuit comprising line 60, line 66, green contacts 50, which are closed by the cam unit in this interval, line 200, through the signal lamp indicator 58, to line 70, which is connected to the common side 72 of the power supply. Also in interval 6, the contacts 52 and 53 are closed to complete the circuit to the capacitor 74 and through the motor coil 55 of the cam unit, as previously described, to charge the capacitor 74 and to rotate the cam unit to interval 7.

Interval 7 is shown in Figure 10, and the controller will remain at rest in this interval with the proceed indication displayed to the operator of the vehicle 32 until the vehicle front wheels 34 pass over the second detector 41. Actuation of the detector 41 connects a circuit from the common side of the power supply 72, line 202, through the detector 41 and the coil 137 of relay 138 to the hot side through line 204 of a power supply taken off of the main power supply, lines 62 and 72, through the transformer 106 and line 206 similarly to the power supply for detector 36. At the same time, the capacitor 74 which was charged between interval 6 and interval 7, as previously described, is connected via line 78 through the closed contacts 49 and line 208 to the contact point 135. The energization of the relay 138 moves the contact 136 out of engagement with the contact 134 and into engagement with contact 135 to complete the circuit from the capacitor 74 through the line 139, contacts 140 and 142, line 146, contacts 148 and 150, line 152 to the ground side 72 of the power supply thereby discharging the capacitor 74.

As previously described, the discharge of the capacitor 74 causes the vacuum tube 112 to become conductive through the plate circuit which in turn causes the controller to be indexed to interval 8 and the circuit for indexing the controller from interval 7 to interval 8 is shown in Figure 11.

Figure 12:
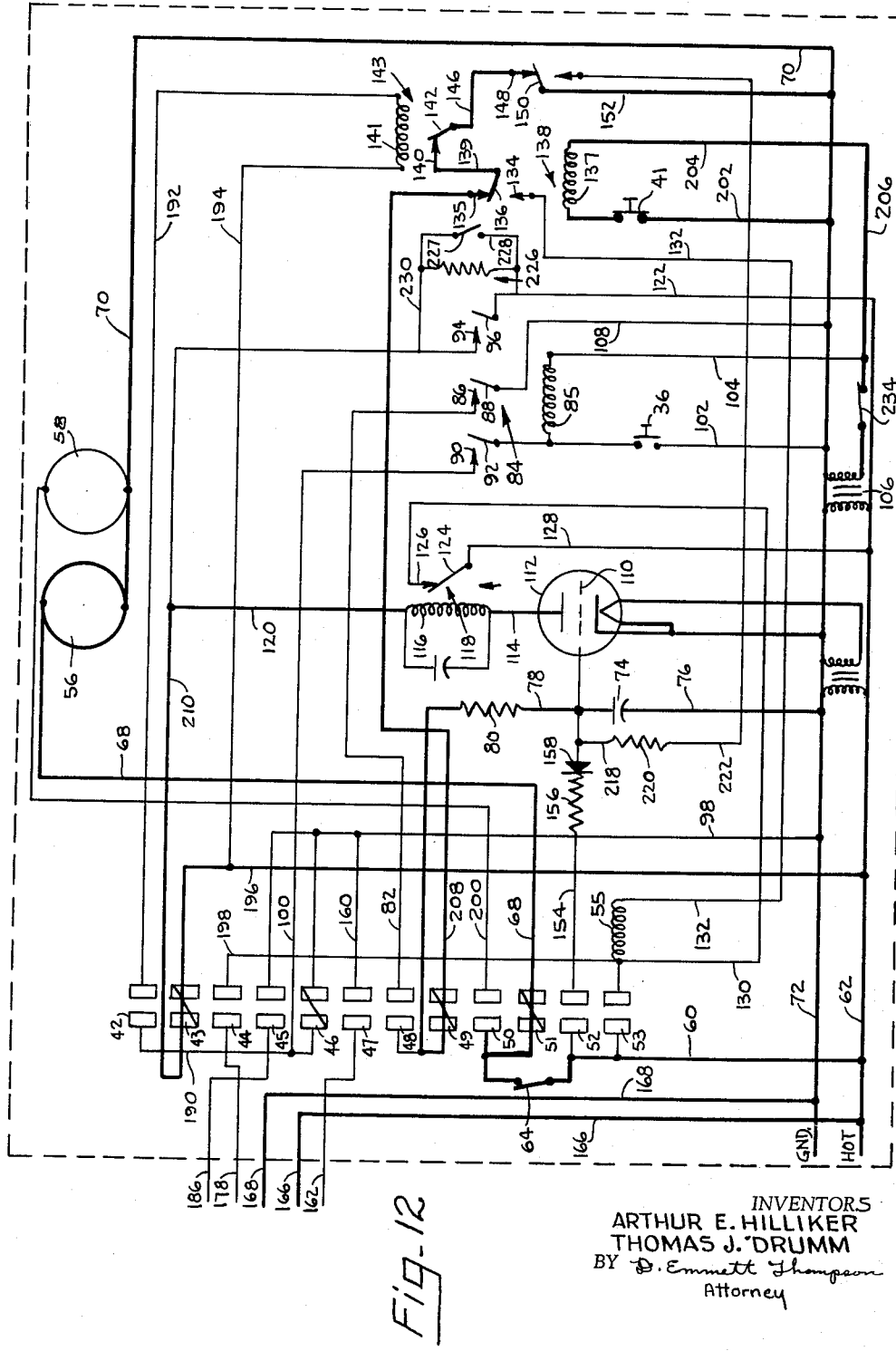

In interval 8, shown in Figure 12, the red light contacts 51 are closed returning the signal display to the stop indication through the circuit previously described and the controller remains in this interval until the rear wheels 35 of vehicle 32 pass over the second detector 41. When detector 41 is thus actuated a circuit is completed through the coil 137 of relay 138, as described in connection with Figure 10, to connect the capacitor 74 through the contacts 49 to ground, as previously described, to permit the capacitor to discharge, thus in turn permitting the vacuum tube 112 to conduct causing the controller to be indexed to interval 1, shown in Figure 3.

Where bumper to bumper traffic is entering the parking facility, the next following vehicle receives a ticket when the rear wheels of the first vehicle actuate the second detector 41. As seen in Figure 12, the stop contacts 43 are closed in this position of the controller and serve to connect the plate circuit through the coil of relay 118 to the hot side of the power supply through the line 120, line 210, closed contacts 43 and line 196. This rotates, or spins the cam shaft through interval 1 to interval 2, illustrated in Figure 5, thus dispensing a ticket to the vehicle that has already actuated the first detector 36.

Referring to the right-hand side of Figure 3, a push button switch 212 is provided in the controller 30 to permit the controller to be indexed manually, one position at a time, by an attendant if the controller has gotten out of sequence with the traffic entering the parking facility for any reason. The switch 212 has a movable contact 150, which is moved into engagement with the contact 214 for each manual actuation of the push button 212. Engagement of the contact 150 with the contact 214, breaks the motor ground circuit, prevnously described, through the contacts 140 and 150 and permits the capacitor 74 to discharge through the circuit comprising line 76, capacitor 74, line 78, line 216, line 218, limiting resistor 220 and line 22 to the contact 214; and from the contact 214 through the contact 150 of push button 212 through line 152 to the ground side 72 of the power supply. When the push button switch 212 is released and allowed to return to its normal position wherein contact 150 engages the contact 148, the motor ground circuit is completed and, since the grid bias from the capacitor 74 has been discharged the controller will run or index until the cam contact 52 closes charging the capacitor 74 to restore the grid bias. This comprises one interval since the capacitor 74 is charged between each interval as previously described.

In this manner, the controller may be indexed, one interval at a time, to correct the defective condition or until the controller has returned to position 1. To move the controller past position 1, the manual automatic switch 226, see Figure 3, must be moved from the position shown in Figure 3, to the position where the switch contact 227 engages the contact 228. In this position, the contacts 94 and 96 of the relay 84 are by-passed to permit the tube 112 to conduct through the circuit comprising line 114, line 120, line 230, contacts 227, 228, and line 122 so as to energize the coil 116 of relay 118 to in turn energize the motor coil 55 to index the controller out of position 1.

A manual switch 234 is provided in the power supply line 206 for the detectors 36 and 41 whereby when an attendant is indexing the controller, as just described, the switch 234 may be opened to prevent vehicular traffic entering the parking facility from falsely actuating the detectors 36 and 41 until the attendant has restored the controller to the proper position for the sequential operation of the controller. The switch 234 may be ganged with the switch 226 to simultaneously disconnect the power from the detectors 36 and 41 while the switch 226 is closed to index the controller past position 1.

As will be obvious, the sequential operation of the controller 30 eliminates all possibilities of the controller being falsely actuated by vehicles backing over either of the detectors 36 or 41, or from vehicles having more than two axles, or in the case of bumper to bumper traffic.

What we claim is:

1. Apparatus for controlling traffic entering a parking facility comprising first and second vehicle detectors positioned in spaced relation along the path of movement of vehicular traffic entering said parking facility, a parking ticket dispensing machine positioned in proximity to one of said detectors, means operable upon actuation of said first detector for issuing a ticket, a traffic signal positioned in the path of movement of said traffic and having stop and proceed indications, said stop indication being normally energized, means operable upon removal of said ticket from said dispenser to change said indication to proceed, and means operable upon actuation of said second detector for returning said indication to stop, and means for storing a second vehicle actuation of said first detector before said second detector receives the first vehicle actuation.

2. A controller for controlling a traffic signal in conjunction with a ticket dispenser whereby to control the entrance of vehicular traffic into a parking facility comprising a main switching member rotatable through a plurality of positions, a plurality of contacts positioned in proximity to said member to be operated by said member to provide a sequence of indications on said traffic signal in conjunction with the issuance of a parking ticket from said dispenser and the actuation of a pair of spaced vehicle detectors positioned in the path of movement of a vehicle entering said parking facility, the actuation of the first of said detectors initiating the rotation of said switching member to cause a ticket to issue from said dispenser, the removal of said ticket causing further rotation of said member to change the signal indication from stop to proceed, and the actuation of the second detector causing said main switching member to return to its initial position in which a stop indication is shown on said traffic signal, and means for energizing an alarm upon actuation of said second detector before removal of said ticket.

3. Apparatus for controlling the entrance of vehicular traffic into a parking facility comprising in combination a parking facility comprising in combination a parking ticket dispensing machine, a signal indicator having stop and proceed indications with said stop indication being normally displayed to traffic entering said facility, first and second vehicle detectors positioned in the path of movement of traffic entering said facility with said first detector positioned in proximity to said ticket dispensing machine and said second detector positioned in proximity to said signal indicator and controller apparatus for sequentially operating said ticket dispensing machine and said signal indicator in response to actuations of said first and second detectors by a vehicle entering said facility, said apparatus having means for storing a second actuation of said first detector prior to completion of the first actuation of said second detector.

4. Apparatus as recited in claim 3, wherein said controller includes means operable in response to actuation of said first detector by a vehicle entering said facility to supply said ticket dispensing machine with a ticket issuing impulse, means operable upon removal of a ticket issued by said machine to change said signal indicator from a normal stop indication to a proceed indication and means operable in response to actuation to said second detector by said vehicle to return said signal indicator to the stop indication.

5. Apparatus as recited in claim 3, wherein said controller comprises a cam unit rotatable through a plurality of discrete positions to close a plurality of contacts in sequential fashion, said cam unit including a normally open running circuit, said circuit being closed upon actuation of said first detector to index said unit to the next position, said running circuit being opened when a vehicle entering said facility halts and continues to actuate said first detector without proceeding.

6. Apparatus as recited in claim 5, wherein said running circuit is provided with switch means for closing said circuit in response to removal of a parking ticket from said machine to index said cam unit to a next position.

7. Apparatus as recited in claim 5, wherein said normally running circuit is provided with switch means for closing said circuit in response to actuation of said second detector by a vehicle proceeding into said facility to index said cam unit to its next position.

8. Apparatus as recited in claim 7 wherein a second actuation of said second detector by said vehicle closes said last-mentioned switch means in said running circuit to index the cam unit to its original position.

References Cited in the file of this patent
UNITED STATES PATENTS

| | | |
|---|---|---|
| 2,163,864 | Bissell | June 27, 1939 |
| 2,301,999 | Bissell | Nov. 17, 1942 |
| 2,528,790 | Scherer | Nov. 7, 1950 |

OTHER REFERENCES

Publications: "American City" June 1957, page 156; "American City" March 1958, page 169; "American City" August 15, 1958, page 124. (Copies may be obtained of the American City from the Scientific Library of this Office.)